United States Patent [19]
Green

[11] Patent Number: 5,192,476
[45] Date of Patent: Mar. 9, 1993

[54] METHOD FOR FORMING A CONDUIT BY PRE-COATING THE CONDUIT PRIOR TO BRAIDING

[75] Inventor: Edward A. Green, Mantua, Ohio

[73] Assignee: Teleflex Incorporated, Limerick, Pa.

[21] Appl. No.: 801,023

[22] Filed: Dec. 2, 1991

[51] Int. Cl.$^5$ .............................................. B29C 63/06
[52] U.S. Cl. ................................ 264/127; 29/890.144; 156/149; 156/244.13; 264/103; 264/137; 264/173; 264/249; 425/113
[58] Field of Search ............... 264/173, 103, 135, 136, 264/137, 127, 249; 425/113; 156/244.13, 149; 29/890.144

[56] References Cited

U.S. PATENT DOCUMENTS

| | | | |
|---|---|---|---|
| 3,359,357 | 12/1967 | Bentley, Jr. et al. | 425/113 |
| 3,907,955 | 9/1975 | Viennot | 264/173 |
| 3,988,189 | 10/1976 | Sullivan | 264/103 |
| 4,099,425 | 7/1978 | Moore | 156/244.13 |
| 4,444,700 | 4/1984 | Fondren | 264/103 |

FOREIGN PATENT DOCUMENTS

| | | | |
|---|---|---|---|
| 55-90347 | 7/1980 | Japan | 264/103 |
| 62-105624 | 5/1987 | Japan | 264/173 |
| 64-60928 | 3/1989 | Japan | 264/136 |

*Primary Examiner*—Jeffery Thurlow
*Attorney, Agent, or Firm*—Reising, Ethington, Barnard, Perry & Milton

[57] ABSTRACT

A method of forming a hose assembly (10) of the type adapted for carrying fuels and other corrosive fluids. An inner liner (16) of a fluorocarbon material is extruded. The inner liner (16) is then passed through a reservoir containing a dispersion including a fluorocarbon polymer material and a fluid. Glass fibers are then braided about the exterior of the inner liner (16) to form a braided layer (18) having the dispersion thereabout such that the dispersion penetrates the interstitial spaces of the braided layer (18). Subsequently, the assembly (10) is heated to remove the fluid. The assembly is then sintered to cure the fluorocarbon polymer material into a coating dispersed throughout the braided layer (18) and about the inner liner (16).

9 Claims, 1 Drawing Sheet

METHOD FOR FORMING A CONDUIT BY PRE-COATING THE CONDUIT PRIOR TO BRAIDING

BACKGROUND OF THE INVENTION

1. Technical Field

The present invention relates to a method for making hose assemblies of the type particularly well adapted for carrying vehicle fuels. More specifically, the subject invention relates to a method for constructing a hose assembly having an inner fluorocarbon polymer liner and a braided layer thereabout.

2. Description of the Related Art

Hose assemblies used for carrying vehicle fuels are well known in the art. Such hose assemblies should preferably be strong and resistant to both heat and chemical degradation. The hoses are subject to chemical breakdown due to exposure to various fuels and additives in the fuels which flow through the interior of the hose. Further, these hoses are typically routed through the engine compartments of vehicles to deliver fuel to the engines. These engines are hot and, thus, the hoses used to carry the fuels are subjected to thermal breakdown from the heat.

TEFLON hoses provide the necessary physical characteristics for carrying fuels. A major drawback with these types of hoses, however, is that when used alone, they tend to become bent during installation resulting in a kink. This kink or deformation remains permanent and provides constant resistance to fluid flow through the hose. To solve this problem, hose assemblies have been constructed which include an inner TEFLON tubular member surrounded by tightly wound metallic braid. The metallic braid allows the TEFLON inner tubular member to bend to a certain degree without kinking. However, if bent passed a certain point, the metallic braid aids in the kinking of the inner tubular member. This type of assembly has three major disadvantages. First, the metallic braid tends to abrade the exterior of the inner tubular member. This causes leaks from the inner tubular member. The second problem is that the exterior metallic braid casing is thermally and electrically conductive. More important is that the metallic braid will retain the heat and transfer the heat to the fuels moving through the inner tubular member causing fuel system problems. Finally, when used in an automotive environment, the metallic braid transmits noise during operation of the vehicle which is undesirable.

To avoid these problems associated with metallic braided layers, the inner tubular member may be supported with an non-metallic braided material. Although the substitution of non-metallic braided material avoids many problems associated with metallic braiding, several problems exist. First, hose kinking remains a problem due to relative longitudinal movement between the inner tubular member and the braided layer. That is, due to relative slippage between inner tubular member and the braided member, the hose assembly is susceptible to kinking. Second, the hose assembly is usually exposed to external heat and chemicals and thus must be resistant to heat and chemical degradation. Most non-metallic braiding material do not provide the requisite heat or chemical resistance required. Third, hose assemblies generally encounter rough surfaces after installation; that is, they rub against engine components. Accordingly, due to exposure to frictional movement, the hose assembly must be resistant to abrasion.

Co-pending application U.S. Ser. No. 657,084 filed Feb. 19, 1991 now U.S. Pat. No. 5,142,782 and its co-pending divisional application U.S. Ser. No. 416,151 filed Oct. 2, 1989 now abandoned which is a continuation-in-part of U.S. Ser. No. 305,641 filed Feb. 2, 1989 and now abandoned, which are all assigned to the assignee of the subject invention, disclose a method for making a coated braided hose assembly. The method comprises the steps of extruding an inner tubular member liner of a polymeric fluorocarbon material and subsequently disposing glass fibers about the exterior of the liner. The inner tubular liner and the braided layer are then passed through a reservoir containing an aqueous dispersion of a fluorocarbon polymer. The fluid of the dispersion, water, is later removed from the hose assembly leaving a fluorocarbon polymer coating dispersed throughout the braided layer.

U.S. Pat. No. 4,311,547 to Biggs et al. issued Jan. 19, 1991 discloses a hose assembly including an inner rubber liner having a reinforced layer braided thereabout. A solidifiable liquid polymer is embedded into the interstices of the reinforcement layer so as to bond the inner rubber liner to the reinforcement layer braided thereabout. The solidifiable liquid polymer may comprise plastisol, aldehyde, epoxy or isocyanate resins. A cover layer may be disposed about the reinforcement layer and bonded thereto by the solidifiable liquid polymer. The cover layer may comprise the same material as that which unites the reinforcement layer and the inner liner; that is, in addition to bonding the inner rubber liner to the reinforcement layer, the solidifiable liquid polymer may also act as the cover layer. Although the solidifiable liquid polymer does in fact bond the inner liner to the reinforcement layer disposed thereabout, it does not sufficiently resist abrasion, heat, or chemical degradation.

The U.S. Pat. No. 4,215,384 to Elson issued Jul. 29, 1980 discloses a hose construction and method for making the same. The hose assembly includes an inner organic polymeric liner having a braided material disposed thereabout. The assembly further includes an outer coating of an organic polymeric material. A conductive strip is disposed within the inner tubular liner for conducting electrical charges throughout the interior of the liner. The assembly further includes end fittings on each end of the inner liner for allowing fluid to be conducted therethrough.

U.S. Pat. No. 4,007,070 to Busdiecker issued Feb. 8, 1977 discloses a hose assembly having an inner organic polymeric liner. The liner has a braided layer disposed thereover. An outer protective layer constructed from an organic polymeric material is disposed about the exterior of the braided layer. The Busdiecker patent discloses the use of an adhesive to bond the inner liner to the braided material. The adhesive also coats the braided material for securing the braided material to an outer protective layer.

The U.S. Pat. No. 4,394,705 to Blachman issued Jul. 19, 1983 discloses a hose assembly including an inner fluorocarbon liner including a reinforcing braided layer disposed thereabout. A cover layer having chemical and abrasion resistant properties is disposed about the braided layer protecting the inner liner and braided layer.

SUMMARY OF INVENTION AND ADVANTAGES

According to the present invention, there is provided a method of forming a hose assembly comprising the steps of providing an inner liner of a fluorocarbon material. The inner liner is coated with a fluorocarbon dispersion. A porous material is applied about the exterior of the inner liner such that the fluorocarbon dispersion is dispersed into the porous material.

Accordingly, there is provided a method for constructing a hose assembly which substantially increases the bonding between the porous material and the inner liner. The result is a strong hose assembly which resists relative movement between the fibers and the inner liner.

BRIEF DESCRIPTION OF THE DRAWINGS

Other advantages of the present invention will be readily appreciated when the same becomes better understood by reference to the following detailed description when considered in connection with the accompanying drawings wherein.

A hose assembly made in accordance with the method of the instant invention is generally shown at 10 in the Figures.

Figure 3:
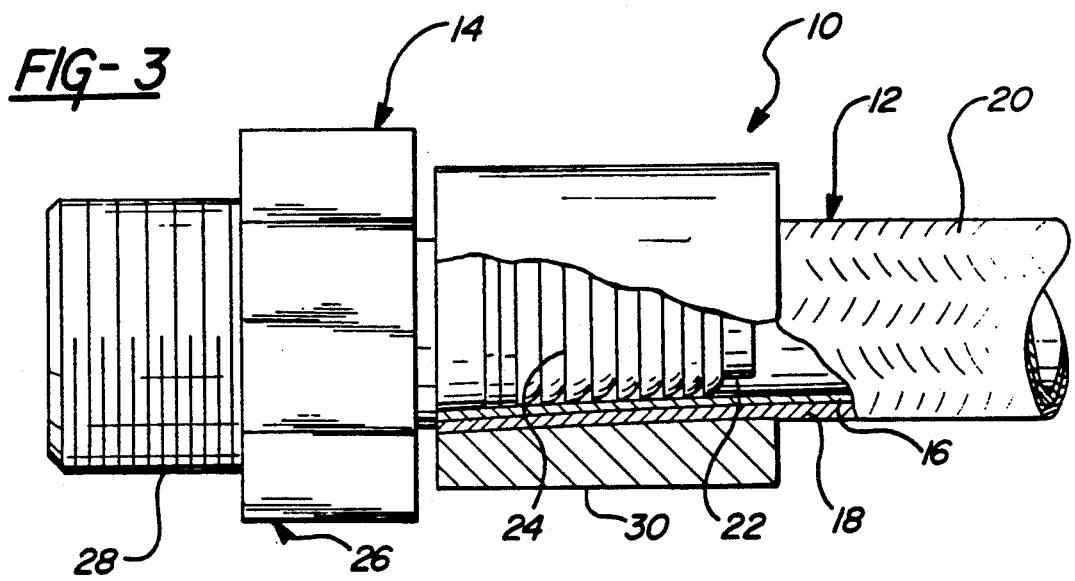
FIG. 3 is a side view partially broken away of an embodiment including a coupling member made in accordance with the method of the instant invention.

The assembly 10 includes a tubular member generally indicated at 12. The assembly further includes coupling means or a coupling assembly generally indicated at 14 (as best viewed in FIG. 3). The coupling assembly 14 is for connecting the ends of the tubular member 12 to mating fittings (not shown) for conducting fluids therethrough.

The tubular member 12 includes an inner organic polymeric liner 16. The inner liner 16 is extruded and has a wall thickness of between 0.001 inches and 0.120 inches. The inner liner 16 is preferably made of a fluorocarbon polymer. Specifically, the inner liner 16 is preferably extruded (utilizing a well known extrusion technique) of the polymer of tetrafluoroethylene (PTFE), the polymer of fluorinated ethylene propylene (FEP), the polymer of perfluoralkoxy resin (PFA) or the polymer of ethylenetetrafluoroethylene (ETFE). The fluorocarbon polymers PTFE, FEP, PFA are sold under the trademark TEFLON by DuPont. The polymer ETFE is sold under the trademark TEFZEL by DuPont.

The inner liner 16 is impervious to fluid flow through the wall thereof. Since the inner liner 16 is preferably made of a fluorocarbon material, it is resistant to both heat and chemical degradation. This allows a variety of fluids, particularly corrosive materials, such as vehicle fuels having various additives, to pass through the interior of the liner 16 without corroding or chemically degrading the liner 16.

The assembly 10 further includes a porous layer 18 about the exterior of the inner liner 16. For example, the porous layer can be a braided or woven layer 18 and can comprise any non-metallic material disposed in interleaving fashion about the inner liner 16 thereby rendering a porous structure capable of providing strength, such as hoop strength, to the assembly. Alternatively, the material may be wrapped about the inner liner 16 such that the fibers are adjacent one another when wrapped, again resulting is a structure exhibiting pores between the material pieces. Preferably, the material to be used to form the braided layer 18 is glass fiber. Glass fibers provided the necessary strength for supporting the inner liner 16. Further, glass fibers are heat resistant, which is important for use in heated environments, such as automobiles.

The fibers may be tightly wound or they may be loosely wound in interleaving fashion having wide gaps or narrow gaps between adjacent fibers defining the porous structure. In the preferred embodiment, the glass fibers are tightly wound such that the gaps or spaces between adjacent fibers are minimal. The braided layer 18 adds to both the hoop strength and the burst strength of the inner liner 16. Particularly, by using a braided layer 18, a higher pressure fluid can flow through the inner liner 16. That is, the working pressure of the inner liner 16 is increased, allowing a higher pressure fluid to flow through the inner liner 16. Further, the braided layer 18 adds to the tensile strength of the hose assembly 10. When the coupling assembly 14 is disposed on the end of the tubular member 12, the braided material 18 increases the tensile strength of the hose assembly 10 sufficiently to fixedly connect any type of coupling member 14 to the tubular member 12.

The braided layer 18 is preferably applied about the exterior of the inner liner 16 by utilizing a braiding machine well known in the art. The machine includes a plurality of spools which carry the fiber material. The fibers are fed through the machine to a braiding area. In the braiding area, the fibers are braided or wound about the inner liner 16 to form the braided layer 18. Alternatively, the braided layer 18 also may be pre-made in sock-like fashion and then applied about the exterior of the inner line 16.

Figure 1:
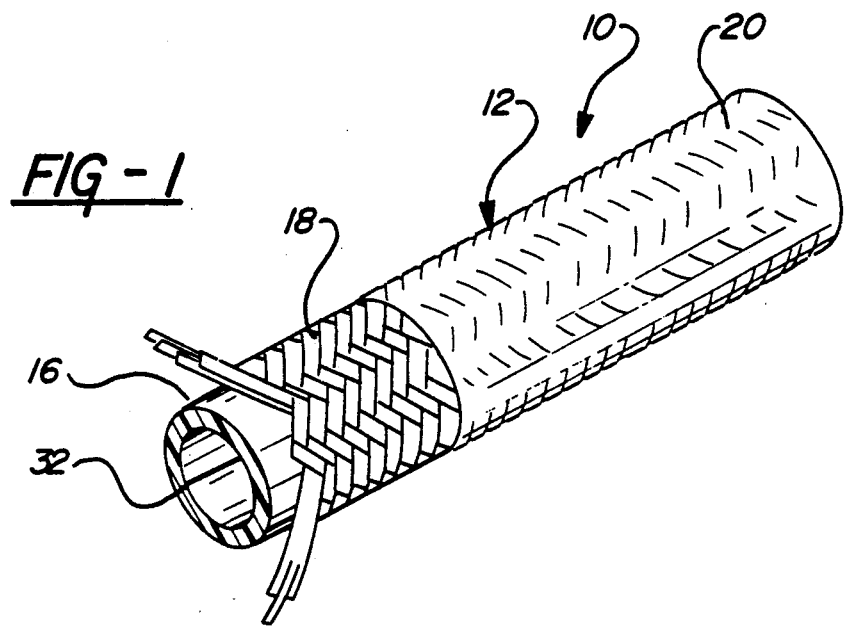
FIG. 1 is a perspective view of an embodiment made in accordance with the method of the instant invention.
Figure 2:
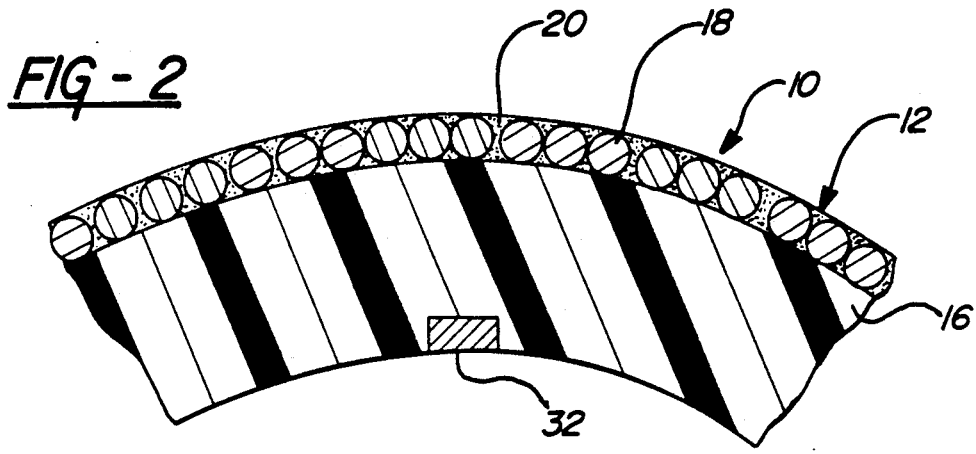
FIG. 2 is an enlarged sectional view of the hose assembly made in accordance with the method of the instant invention.

The assembly 10 further includes an organic polymeric coating 20 dispersed throughout the braided layer 18 (as best shown in FIG. 2). That is, the coating 20 is distributed within the in interstices of the layer 18 forming a single layer therewith. The coating 20 is located from the outer periphery of the layer 18 radially inwardly toward the inner liner 16. Preferably, the coating 20 comprises a fluorocarbon polymer coating 20 and is one of the following materials:

the polymer of tetrafluoroethylene (PTFE), the polymer of fluorinated ethylene propylene (FEP) the polymer of perfluoroakloxy resin (PFA), or the polymer of ethylenetetrafluoroethylene (ETFE).

Due to the properties of the fluorocarbon polymer material, the coating 20 provides the hose assembly 10 with the necessary resistance to both heat and chemical degradation while also bonding the braided layer 18 to the inner liner 16. The coating 20 covers or coats the glass fibers of the braided layer 18. That is, the coating 20 covers the fibers of the braided layer 18 from the outer periphery radially inwardly. The coating 20, therefore, does not extend radially outwardly from the outer periphery of the braided layer 18. In effect, the result is a coating 20 having the braided layer 18 therein.

The outer coating 20 is formed by applying the organic polymeric material about the inner liner 16 before braiding or weaving glass fibers about the inner liner 16 as described above. Preferably, the organic polymeric material comprises a dispersion containing the fluorocarbon polymer material, a carrying agent (i.e., a solvent). A surfactant may also be used in the dispersion. Preferably, the dispersion comprises between about 50% to about 60% solid fluorocarbon polymer material (in fine granules or particle form), and between about 40% and about 50% carrying agent or solvent. The carrying agent carries the solid fluorocarbon material and disperses onto the inner liner 16. The preferred carrying agent is water, but other suitable carrying agents may be used. If a surfactant is used, it is preferably in the area of between 1% and about 10% of the total weight. Any suitable surfactant may be used, such as FLUORAD FLUOROCHEMICAL FC 171 (liquid) and FLUORAD FLUOROCHEMICAL FC 143 (powder) sold by the 3M Corporation, and SILWETT 77 sold by Unioncarbide have been found to work especially well.

Once the dispersion is applied about the inner liner 16, the braided material 18 is then disposed about the inner liner 16 having the dispersion thereon. Using braided material, the braiding is done in such a manner that the braiding operation forces the dispersion into the interstitial spaces of the braided layer 18 and about the exterior of all of the glass fibers in the braided layer 18. That is, enough dispersion is applied about the inner liner 16 so as to coat the entire braided layer 18 as the braided layer 18 is applied about the exterior of the inner liner 16 having the dispersion thereon. In this manner, the outer periphery of each individual fiber is completely coated. The carrying agent and surfactant, if used, are then removed from the dispersion by drying (heating) the hose assembly 10 thereby leaving the fluorocarbon polymer material dispersed throughout the entirety of the braided layer 18. The assembly 10 is subsequently sintered to cure the fluorocarbon polymer material dispersed throughout the braided layer 18 into a coating 20. The sintering operation fuses the fluorocarbon polymer material to form the coating 20.

As previously stated, both the inner liner 16 and the coating 20 are preferably fluorocarbon polymers. It is not necessary that both the inner liner 16 and the outer coating 20 be of the same fluorocarbon polymer, although they may be. For example, the inner liner 16 may be made of PFA while the coating 20 is made of PTFE. Any combination of the fluorocarbon polymers may be utilized for the inner liner 16 and the coating 20. By utilizing similar fluorocarbon polymers, a strong bond between the inner liner 16 and the coating 20 is achieved. Furthermore, by coating the inner liner 16 prior to braiding the braided layer 18 about the inner liner 16, it is ensured that a sufficient amount of polymer will be retained between the braided layer 18 and the inner liner 16. This also increases the bond between the coating 20 and the inner liner 16.

The coating 20 acts as an adhesive to bond the braided layer 18 to the inner liner 16, thus, prohibiting slippage, i.e. relative longitudinal or rotary movement therebetween. Accordingly, the coating 20, in conjunction with the braided layer 18 allows the inner liner 16 to be bent while resisting kinking or permanent deformation. That is, the coating 20, dispersed throughout the braided layer 18 provides strength to the inner liner 16 upon bending. This is commonly referred to as hoop strength. Thus, by using a polymeric coating 20 dispersed throughout the braided layer 18, a trim profile assembly is produced which results in the hoop strength of the tubular member 12 being increased so that the tubular member 12 can be bent without kinking. Further, the outer coating 20 adds to the working pressure of the hose. That is, the coating 20 provides strength and allows the inner liner 16 to accommodate fluids under pressure. Also, the coating 20, due to the inherent properties of polymeric fluorocarbon materials therein, hinders or resists abrasion of the tubular member 12. Said another way, the coating 20 aids in the abrasion-resistance of the tubular member 12 and braided layer 18. Because the coating 20 is continuous about the outer periphery of the braided layer 18, the braided layer is not subject to abrasion.

The assembly 10 includes the coupling assembly 14. The coupling assembly 14 is for connecting the tubular member 12 to a fitting (not shown). The fitting is adapted to cooperate with the coupling assembly 14. The coupling assembly 14 includes an insert portion, generally indicated at 22 for inserting into and engaging the interior of the inner liner 16. The insert portion 22 may have a plurality of barbs 24 thereon for engaging the interior of the inner liner 16 (as best viewed in FIG. 3). The coupling assembly 14 further includes an engaging portion generally indicated at 26. The engaging portion 26 extends longitudinally from the insert portion 22. The engaging portion 26 may comprise a male threaded member 28 or alternatively the engaging portion 26 may comprise a female threaded portion (not shown). The engaging portion 26 may comprise any configuration adapted to cooperated with a member to which it will be fixed. For example, the engaging portion 26 may comprise a socket to receive a mating ball joint. Finally, the coupling assembly 14 includes a locking collar 30. The locking collar 30 is disposed about the exterior of the outer coating 20 and is slid until it is disposed radially about the insert portion 22 of the coupling assembly 14. In this manner, the inner liner 16 is forced into tight frictional engagement with the barbs 24 on the insert portion 22 to prevent relative axially movement between the inner liner 16 and the insert portion 22. The coupling assembly 14 can be of any other well known type. For example, the coupling member 14 may be of an organic polymeric material and may be molded about the tubular member 12 for a mechanical connection or fusion bond.

As fluid flows through the inner liner 16, electrical charges tend to build throughout the length of the liner 16. In order to prevent these electrical charges from accumulating, the inner liner 16 has an integral longitudinal conductive means co-extensive with the length of the inner liner 16 for conducting an electrical charge through the inner liner 16. Preferably, the inner liner 16 includes a strip 32 of carbon black. The carbon black is electrically conductive and will dissipate any electrical charges built up by the fluid. Alternatively, the whole inner liner 16 can comprise the conductive means. This is done by using carbon black throughout the entire inner liner 12. The electrically conductive strip 32 must be on at least the inside diameter of the inner liner 16 in order to dissipate charges built up inside the inner liner 16.

The braided layer 18 and coating 20 are preferably electrically non-conductive. This is important in that electrical charges applied to the exterior of the coating 20 will not be conducted throughout the length of the tubular member 12 or to the fluid passing through the interior of the inner liner 16.

The preferred method for making the hose assembly 10 as shown in the Figures is as follows. The inner organic polymeric liner 16 is provided. Specifically, the inner liner 16 is extruded in well known manner from a fluorocarbon polymer. Preferably, the conductive strip is simultaneously extruded into the liner 16. The liner 16 is passed through a reservoir containing the aqueous dispersion of the fluorocarbon polymer material. Alternatively, the dispersion may be sprayed onto the inner liner 16 or may be brushed onto the inner liner 16. If no surfactant is contained in the dispersion material, and it is desired that a surfactant be used, it is applied to the assembly by dipping the assembly in a reservoir containing the surfactant or spraying the surfactant directly thereon. Preferably, the surfactant would be applied to the inner liner 16 prior to applying the polymeric fluorocarbon dispersion to the inner liner 16. That is, regardless of whether the dispersion contains the surfactant therein, surfactant may be applied to the hose assembly prior to applying the dispersion thereto.

As was previously stated, the reservoir containing the dispersion therein can comprise a chamber having the solution therein, or the reservoir may comprise brushes having the dispersion thereon. The brushes are in continuous engagement with the inner liner 16 to coat the liner 16.

Preferably, the dispersion is an aqueous dispersion including the fluorocarbon polymer material therein. Because the dispersion is preferably aqueous, the preferred carrying agent is water. The dispersion is applied about the entire inner liner 16. The braided material is then applied about the exterior of the inner liner 16 having the dispersion thereon by braiding, weaving or wrapping the fibers about the inner liner 16. Alternatively, the fibers may be braided to form a sock like construction into which the inner liner 16 is placed. The braided material is applied such that the dispersion is dispersed into the intersticial spaces of the braided layer 18. That is, by wrapping the braided material about the inner liner 16, some of the dispersion is forced into the intersticial spaces and about the exterior of the fibers.

After the braiding is completed, the carrying agent and surfactant (if any) are removed from the dispersion. Specifically, the assembly 10 is sent to a dryer (a preheated oven) which is preferably below the boiling temperature of the carrying agent (e.g., for water 212° F.). By utilizing an oven at a temperature below the boiling temperature of the carrying agent, a bubbling effect is avoided in the final product. The temperature can be above the boiling temperature, however, the assembly 10 may contain many air bubbles in the coating 20 if higher temperatures are used. Subsequently, the surfactant (if used) is removed from the dispersion by heating the assembly 10 as discussed above. Generally, higher temperatures are required to remove the surfactant than those required to remove the carrying agent, i.e., usually 450° to 575° F. Thus, once the carrying agent and surfactant (if any) are removed from the dispersion, the fluorocarbon material is left dispersed throughout the entirety of the braided layer 18 and about the inner liner 16. The assembly 10 is then sintered at a suitable temperature (roughly 700° F.) to cure fluorocarbon polymer material into the coating 20. That is, the particular fluorocarbon polymer material is fused at the elevated temperatures to form a continuous coating 20. Because glass fibers are used for the braided layer 18, they are unaffected by the heat required to sinter the tubular member 12. Finally, the coupling member 14 may be secured at one or both ends of the tubular member 12 to secure the assembly 10 to a fitting (not shown) for conductive fluid through the inner liner 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of forming a hose assembly (10) comprising the steps of:
   providing an inner liner (16) consisting essentially of a polymeric fluorocarbon material;
   coating the inner liner with a fluorocarbon dispersion;
   applying a woven or braided material (18) having gaps therein about the exterior of the inner liner and the fluorocarbon dispersion coating;
   dispersing the fluorocarbon dispersion into the gaps of the woven or braided material (18) to form a single layer of fluorocarbon dispersion and the woven or braided material (18); and
   sintering the inner liner and woven material to cure the fluorocarbon polymer coating (20).

2. A method as set forth in claim 1 further characterized by coating the inner liner by passing the inner liner (16) through a reservoir containing the fluorocarbon polymer dispersion.

3. A method as set forth in claim 2 further characterized by coating the inner liner (16) by spraying the fluorocarbon polymer dispersion onto the inner liner.

4. A method as set forth in either claim 2 or 3 further characterized by utilizing a fluorocarbon polymer dispersion comprising a fluorocarbon polymer material and at least one carrying fluid.

5. A method as set forth in claim 4 further characterized by removing the carrying fluid to leave a fluorocarbon polymer coating (20) about the woven or braided material.

6. A method as set forth in claim 1 further characterized by securing at least one end fitting to the inner liner (16) having the woven or braided material (18) thereabout.

7. A method as set forth in claim 6 further characterized by utilizing a nonmetallic material for the woven or braided material (18).

8. A method as set forth in claim 7 further characterized by providing an inner liner (16) by extruding the inner liner (16).

9. A method as set forth in claim 8 further characterized by utilizing water as the carrying fluid to form an aqueous fluorocarbon dispersion.

* * * * *